United States Patent
Wille et al.

(10) Patent No.: US 8,515,617 B2
(45) Date of Patent: Aug. 20, 2013

(54) MOTOR VEHICLE CONTROL SYSTEM

(75) Inventors: Frank-Martin Wille, Gaimersheim (DE); Holger Esser, Ingolstadt (DE); Heinz-Willi Vassen, Buxheim (DE); Tobias Ammler, Unterstall (DE); Norbert Ammler, Bergheim (DE); Helmut Lebmeier, Langenmosen (DE); Yvonne Grob, Gaimersheim (DE); Hans-Christian Jung, Ingolstadt (DE); Rudolf Leinfelder, Eichstätt (DE); Jens Kötz, Eitensheim (DE); Carsten Krömke, Braunschweig (DE); Stefan Anderlik, Zellendorf (DE); Christian Penshorn, Edemissen (DE); Matthias Wenzel, Detmold (DE)

(73) Assignees: Audi AG, Ingolstadt (DE); Volkswagen AG, Wolfsburg (DE)

( * ) Notice: Subject to any disclaimer, the term of this patent is extended or adjusted under 35 U.S.C. 154(b) by 1722 days.

(21) Appl. No.: 10/593,453

(22) PCT Filed: Mar. 11, 2005

(86) PCT No.: PCT/EP2005/002574

§ 371 (c)(1),
(2), (4) Date: Sep. 19, 2006

(87) PCT Pub. No.: WO2005/092660

PCT Pub. Date: Oct. 6, 2005

(65) Prior Publication Data

US 2007/0198137 A1    Aug. 23, 2007

(30) Foreign Application Priority Data

Mar. 19, 2004 (DE) .................. 10 2004 013 630

(51) Int. Cl.
*G01M 17/00* (2006.01)

(52) U.S. Cl.
USPC .................. 701/33.4; 701/29.1; 340/438

(58) Field of Classification Search
USPC ............ 701/1, 36, 29.1, 33.4, 34.4; 340/438, 340/439; 345/204
See application file for complete search history.

(56) References Cited

U.S. PATENT DOCUMENTS 6,275,231 B1 * 8/2001 Obradovich .................. 345/156
2002/0015035 A1 * 2/2002 Inaba et al. .................. 345/204

FOREIGN PATENT DOCUMENTS

| DE | 28 43 135 | 4/1979 |
|----|-----------|--------|
| DE | 41 40 864 | 6/1992 |
| DE | 44 44 443 | 6/1996 |
| DE | 195 07 997 | 9/1996 |
| DE | 196 04 351 | 8/1997 |
| DE | 197 36 231 | 2/1999 |
| DE | 197 39 357 | 3/1999 |
| DE | 198 19 822 | 11/1999 |

(Continued)

*Primary Examiner* — Helal A Algahaim
(74) *Attorney, Agent, or Firm* — Staas & Halsey LLP

(57) ABSTRACT

A control system for a motor vehicle comprises an output control unit for outputting data related to the operation of the motor vehicle and an operation control unit spatially separated from the output control unit for generating or providing data related to the operation of the motor vehicle. The output control unit comprises a data storage for storing data related to the operation of the motor vehicle and the data related to the operation of the motor vehicle can be read out of the data storage and outputted by the output control unit.

12 Claims, 5 Drawing Sheets

(56) References Cited

FOREIGN PATENT DOCUMENTS

| | | |
|---|---|---|
| DE | 198 36 000 | 2/2000 |
| DE | 198 50 454 | 5/2000 |
| DE | 199 19 216 | 11/2000 |
| DE | 100 22 233 | 11/2001 |
| DE | 100 44 891 | 3/2002 |
| DE | 100 44 892 | 3/2002 |
| DE | 100 52 654 | 5/2002 |
| DE | 101 53 987 | 5/2003 |
| EP | 0 701 926 | 3/1996 |
| EP | 0 978 433 | 2/2000 |

* cited by examiner

MOTOR VEHICLE CONTROL SYSTEM

This application is a U.S. National Stage of PCT/EP2005/002574, having been filed Mar. 11, 2005, which claims priority from DE 10 2004 013 630.0, having been filed on Mar. 19, 2004.

This invention relates to a motor vehicle control system and a process for controlling a motor vehicle with an output control for the purpose of putting out information concerning the operation of the motor vehicle and a functional control that is separated in terms of space from the output control for the purpose of generating and/or supplying information concerning the operation of the motor vehicle.

DE 100 44 892 A1 discloses a method for the operation of a multifunctional display device in a motor vehicle where a function or a parameter is indicated or newly indicated by selecting a menu point, where the data contents or messages from various units in the motor vehicle are stored in a control unit that corresponds in a bi-directional manner with the display device and where a priority value is associated with or is made to be associated with a currently chosen display, which is cyclically sent back to the control unit, so that only then another data content is indicated when it is chosen separately or when it has a higher priority value.

DE 100 44 891 A1 discloses a process for the operation of a multifunctional, menu-controlled display device in a motor vehicle where, by selecting a menu point, in each case a function or a parameter is indicated or is indicated again, whereby the data contents of indications from various units in the motor vehicle are stored in a function-related and/or unit-related manner in a control unit that corresponds in a bidirectional manner to the display unit, whereby, in case of selection of a menu point, initially only a headline of a memory unit is displayed and where, subsequently by operating a corresponding push button, the entire memory content related to the headline is transmitted and displayed. In the process, by means of a menu selection, one can build up or maintain a bi-directional question/answer connection between the control unit and the display unit. The desired function or parameter display can be chosen, for example, by a rolling function (scroll up/down).

Other display devices are known from DE 196 04 351 A1, DE 197 39 357 A1, EP 0 978 433 A2 and EP 0 701 926 A2.

The object of the invention is to improve the operability of a motor vehicle by means of a display device.

The abovementioned problem is solved by a control system for a motor vehicle with an output control for the purpose of putting out information concerning the operation of the motor vehicle, for example, to an operator, and with a functional control separated in terms of space from the output control for the generation and/or supply of the information concerning the operation of the motor vehicle, in particular, whereby the information concerning the operation of the motor vehicle can be transmitted to the control unit by means of a communication link from the functional control to the output control, preferably made in the form of a bus system, whereby the output control comprises an information memory for the storage of the information concerning the operation of the motor vehicle and whereby the information concerning the operation of the motor vehicle, in particular, when required to put out the information that concerns the operation of the vehicle, can be read out of the information memory and can be put out by the output control, for example, to the operator. An information item concerning the operation of the motor vehicle can be speed, engine rpm, oil pressure, coolant temperature, vehicle inclination, interior space temperature, a radio transmitter located in the receiving area of the motor vehicle, a geographic site of the motor vehicle, a closing state regarding doors, a selected musical title or the like. Information concerning the operation of the motor vehicle, however, can also be a current clock time.

In an advantageous embodiment of the invention, the information concerning the operation of the motor vehicle can be read out of the information memory and can be put out by the output control to the operator in case the operator made a request for the output of the information concerning the operation of the motor vehicle.

In a further advantageous embodiment of the invention, the information concerning the operation of the motor vehicle can be transmitted from the functional control to the output control by means of a communication link, advantageously made as a bus system, independently of a request, for example, addressed to the operator for the purpose of putting out the information concerning the operation of the motor vehicle.

In another advantageous embodiment of the invention, the information concerning the operation of the motor vehicle can be transmitted from the functional control to the output control in case of a change of the information concerning the operation of the motor vehicle through the functional control.

In another advantageous embodiment of the invention, the information concerning the operation of the motor vehicle can be transmitted from the functional control to the output control after expiration of an especially adjustable repeat time.

In another advantageous embodiment of the invention, one can by means of the output control monitor whether, within the repeat time, the information concerning the operation of the motor vehicle was transmitted from the functional control to the output control. In another advantageous embodiment of the invention, the information concerning the operation of the motor vehicle can be put out from the information memory not function of the output control, for example, to the operator, in particular, in case of a request to put out the information concerning the operation of the motor vehicle when the information concerning the operation of the motor vehicle was not transmitted from the functional control to the output control within the repeat time or within a time lapse, whereby the time lapse is longer than the repeat time.

In another advantageous embodiment of the invention, the output control comprises a display for the optical illustration of the information concerning the operation of the motor vehicle.

In another advantageous embodiment of the invention, the output control comprises an input device for putting in a request to put out and/or optically to illustrate the information concerning the operation of the motor vehicle and/or there is associated with the output control an input device for the purpose of putting in a requirement to put out and/or optically illustrate the information concerning the operation of the motor vehicle.

In an advantageous embodiment of the invention, the information memory is associated with layer 4, layer 5 and/or—advantageously—layer 6 of the ISO/OSI layered model (ISO 7498). In another advantageous development of the invention, the information memory is arranged between the communication link and an interface whose data format is independent of the specific layout of the communication link. An additional information memory, however, can also be arranged beyond that interface.

The abovementioned problem—in particular, in conjunction with the abovementioned features—is furthermore solved by a control system for a motor vehicle with an output control for putting out information concerning the operation of the motor vehicle, for example, to an operator, and with a functional control separated in terms of space from the output control for the generation and/or supply of the information item concerning the operation of the motor vehicle, in particular, whereby the information concerning the operation of the motor vehicle can be transmitted from the functional control to the output control by a communication link, preferably made as a bus system, whereby the output control comprises an information memory for the storage of the information concerning the operation of the motor vehicle, and whereby the information concerning the operation of the motor vehicle can be read out of the information memory, in particular, in case of a request to put out the information concerning the operation of the motor vehicle, and can be put out, for example, to the operator, by the output control, provided the information concerning the operation of the motor vehicle was transmitted from the functional control to the output control within a time lapse.

The abovementioned problem is solved—especially in conjunction with the abovementioned features—furthermore by a motor vehicle with an output control for putting out an information concerning the operation of the motor vehicle, for example, to an operator, and with a functional control separated in terms of space from the output control for the generation and/or supply of the information concerning the operation of the motor vehicle, in particular, whereby the information concerning the operation of the motor vehicle can be transmitted from the functional control to the output control by means of a communication link, preferably made as a bus system, whereby the output control comprises an information memory for the storage of the information concerning the operation of the motor vehicle and whereby the information concerning the operation of the motor vehicle can be read out of the information memory, in particular, in case of a request to put out the information concerning the operation of the motor vehicle, and can be put out, for example, to the operator by the output control, although especially only to the extent that the information concerning the operation of the motor vehicle was transmitted from the functional control to the output control within a time lapse.

The abovementioned problem—especially in conjunction with the abovementioned features—is furthermore solved by a method for controlling a motor vehicle with an output device for putting out information concerning the operation of the motor vehicle, for example, to an operator, and with a functional control separated in terms of space from the output control for the purpose of generating and/or supplying information concerning the operation of the motor vehicle, in particular, whereby the information concerning the operation of the motor vehicle can be transmitted from the functional control to the output control by means of a communication link, preferably made as a bus system, whereby the output control comprises an information memory for the storage of the information concerning the operation of the motor vehicle, whereby the information concerning the operation of the motor vehicle can be read out of the information memory, especially in case of a request to put out the information concerning the operation of the motor vehicle, and can be out put, for example, to the operator, although especially only to the extent that the information concerning the operation of the motor vehicle was transmitted from the functional control to the output control within a time lapse.

In an advantageous embodiment of the invention, the information concerning the operation of the motor vehicle is transmitted beforehand by means of a communication link, preferably made as a bus system, from the functional control to the output control, in particular, into the information memory.

In an advantageous embodiment of the invention, the information concerning the operation of the motor vehicle is transmitted from the functional control to the output control, in particular, into the information memory by means of a communication link advantageously made as a bus system, especially beforehand, independently of a request, for example, to the operator, to put out the information concerning the operation of the motor vehicle.

In another advantageous embodiment of the invention, the information concerning the operation of the motor vehicle is transmitted from the functional control to the output control in case of a change of the information concerning the operation of the motor vehicle through the functional control.

In another advantageous embodiment of the invention, the information concerning the operation of the motor vehicle is transmitted from the functional control to the output control after expiration of an especially adjustable repeat time.

In another advantageous embodiment of the invention, one uses the output control to monitor whether, within the repeat time, the information concerning the operation of the motor vehicle was transmitted from the functional control to the output control.

In another advantageous embodiment of the invention, the information concerning the operation of the motor vehicle is put out of the information memory not from the output control, for example, to the operator, in particular, in case of a request to put out the information concerning the operation of the motor vehicle when the information concerning the operation of the motor vehicle was not transmitted from the functional control to the output control within the repeat time or a time lapse, whereby the time lapse is equal to or longer than the repeat time.

A motor vehicle in terms of the invention is, in particular, a land vehicle that can be used individually in road traffic. Motor vehicles in terms of the invention, in particular, are not confined to land vehicles equipped with an internal combustion engine.

Other advantages and details will emerge from the following description of exemplary embodiments. Specifically:

Figure 1:
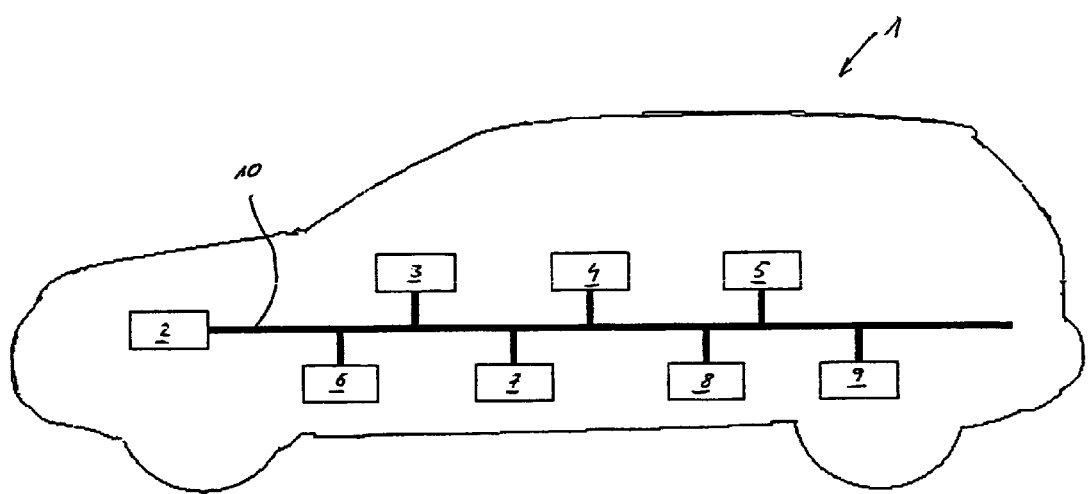
FIG. 1 shows an exemplary embodiment of a motor vehicle.

FIG. 1 shows an exemplary embodiment of a motor vehicle 1 in the form of a schematic view. Motor vehicle 1 has an engine control 2, a combination display 3 for the purpose of displaying speed, engine rpm, cooling water temperature and the like, a multifunctional display device 4 with a touch screen for the operation of a climate-controlled system 6, a navigation system 7, a music module 8, and a telephone module 9 as well as an acoustic output device 5. Engine control 2, combination display 3, multifunctional display device 4, output device 5, climate-controlled system 6, navigation system 7, music module 8 and/or telephone module 9 are connected via a bus system 10 for the exchange of data or information. The climate-controlled system 6, the navigation system 7, the music module 8 and the telephone module 9 can be implemented in each case on a separate hardware—as shown in FIG. 1—but all of them can be implemented on a common hardware or only in part.

Figure 2:
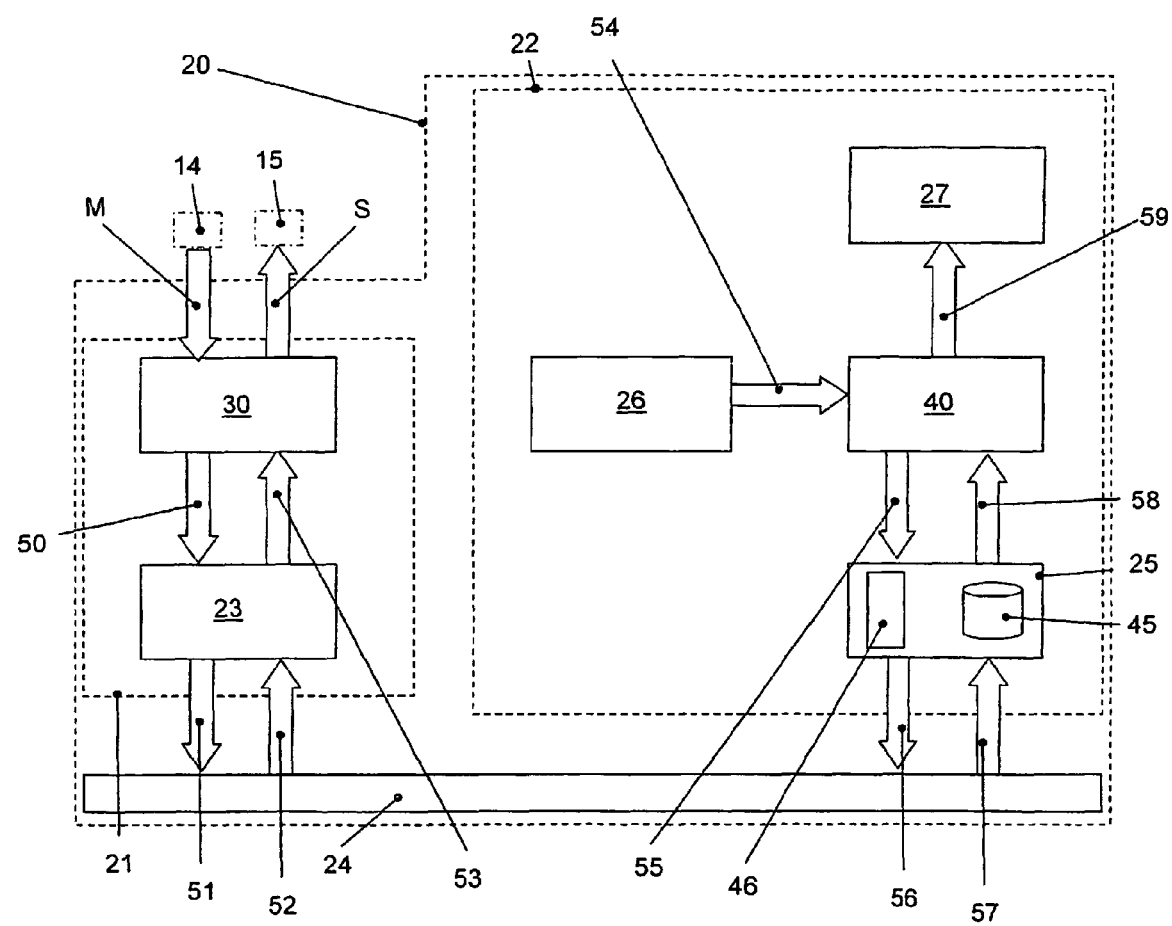
FIG. 2 shows an exemplary embodiment of a control system.

Engine control 2, climate-controlled system 6, navigation system 7, music module 8 and/or telephone module 9 together with bus system 10 and combination display 3, multifunctional display device 4 and/or output device 5 constitute a control system that is illustrated in FIG. 2 and that is labeled with the reference number 20. Reference number 22 represents an output control that is separated in terms of space from a functional control 21 for the generation or supply of information concerning the operation of the motor vehicle. The information concerning the operation of the motor vehicle can be an engine rpm, an oil pressure figure, a coolant temperature, a motor vehicle inclination, a distance to an obstacle, an interior space temperature, a radio transmitter located within the reception range of the motor vehicle 1, the geographic location of motor vehicle 1, a closing state of doors, a current clock time and/or a selected musical title. Functional control 21 can correspond to the engine control 2, the climate-controlled system 6, the navigation system 7, the music module 8 and/or the phone module 9. Output control 22 can correspond to the combination display 3, the touch screen 4 and/or the acoustic output device 5. The information concerning the operation of the motor vehicle can be transmitted from the functional control 21 to the output control 22, which corresponds to the bus system 10 by means of a bus system 24.

Functional control 21 comprises a functional control part for the control of functions of motor vehicle 1, for example, by means of the control or regulation of actuators 15 by means of the generation of control signals S and by reading-in measurement signals M generated by sensors 14. Such a control signal S can be an electrical signal corresponding to the required temperature for a cooling device. A measurement signal M can be an electrical signal corresponding to the measured actual temperature. Such an actual temperature can be information concerning the operation of motor vehicle 1 in terms of the claims. But such a required temperature can also be information concerning the operation of motor vehicle 1 in terms of the claims. Functional control part 30 thus serves for the actual generation or supply of the information concerning the operation of motor vehicle 1.

Functional control 21 comprises an interface module 23 for the translation of information 50 to be put out in a format that can be generated by functional control part 30 into an information item 51 in the transmission format of bus system 24 and/or for the translation of an information item 52 in the transmission format of bus system 24 into an information item 53 in a format that can be read in from the functional control part 30.

Output control 22 comprises a display 27 for the optical illustration of information concerning the operation of the motor vehicle such as, for example, the engine rpm, the oil pressure, the coolant temperature, the vehicle inclination, a distance to an obstacle, an interior space temperature, a radio transmitter located in the receiving range of motor vehicle 1, the geographic location of motor vehicle 1, a closing state of doors, the current clock time and/or the selected musical title. To activate display 27, output control 22 comprises an output control part 40, whereby a display control signal 59 is put out by output control part 40.

In the exemplary embodiment at hand, output control 22 comprises an input device 26 for putting in a request for optical illustration of an information item concerning the operation of the motor vehicle and for putting out a corresponding requirement signal 54. Input device 26—as in the exemplary embodiment at hand—can be a part of the output control 22. Input device 26 can comprise operating elements arranged, for example, next to display 27. Input device 26, however, can also comprise a touch screen arranged on display 27. Input device 26, however, can also be arranged away from output control 22 in terms of space and can merely be associated with the latter.

Output control 22 furthermore comprises an interface module 25 for the translation of information 55 in a format that can be generated by the output control part 40 into information 56 in the transmission format of bus system 24 and/or for translation of an information item 57 in the transmission format of bus system 24 into an information item 58 in a format that can be read in from the output control part 40.

The format that can be read in or put out by functional control part 21 or by output control part 22 depends on the specific layout of bus systems 10 or 24. For example, bus system 10 or bus system 24 can be a CAN bus system, a MOST bus system, a LIN bus system or the like. The format that can be read in or put out by functional control part 21 or by output control part 22 is untouched by any such specific layout.

Interface module 25 comprises an information memory 45 for the storage of one or several information items concerning the operation of motor vehicle 1. These data concerning the operation of motor vehicle 1 are transmitted from functional control 21 to output control 22, whereby—in case of faultless operation—a transmission always takes place when an information item concerning the operation of the motor vehicle has changed or when a predetermined repeat time has elapsed since the last transmission. The repeat time can vary for different data concerning the operation of the motor vehicle. The repeat time, in particular, amounts to more than one second.

Figure 3:
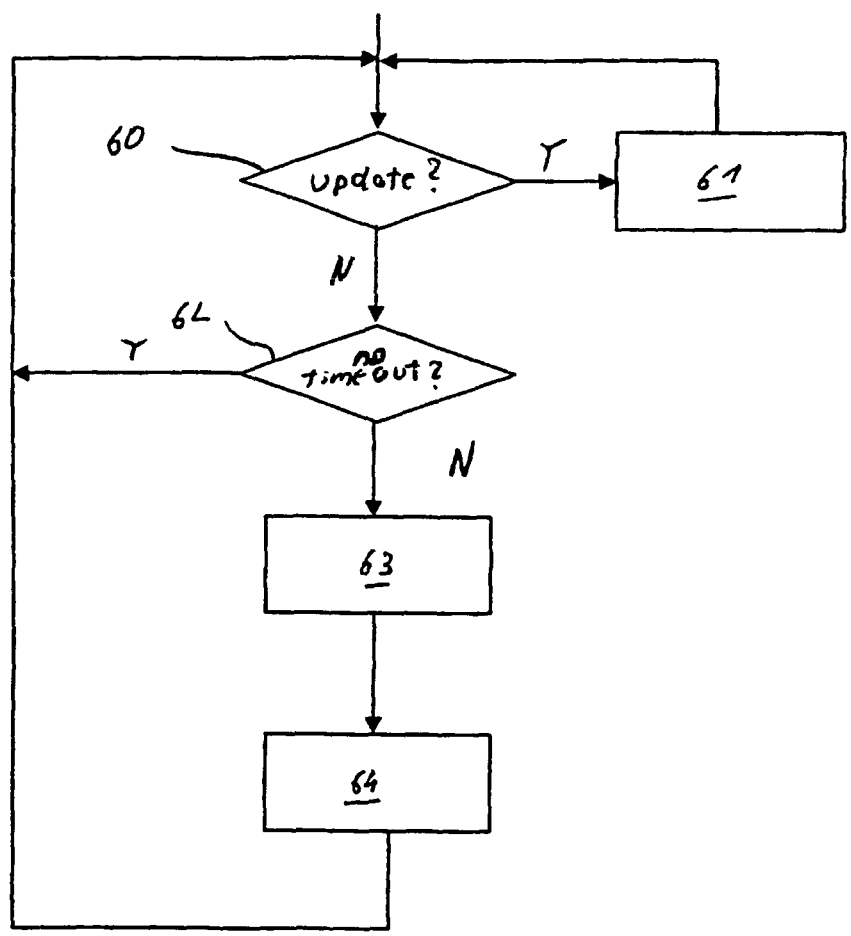
FIG. 3 shows an exemplary embodiment of a monitoring module.

Interface module 25 comprises a monitoring module 46—that is explained in greater detail with reference to FIG. 3 in the form of an exemplary embodiment—for the purpose of monitoring the abovementioned transmission of the data concerning the operation of the motor vehicle. The exemplary procedure, illustrated in FIG. 3, starts with an inquiry 60 as to whether a new value has been received for an information item concerning the operation of the motor vehicle, which item is to be monitored.

If no new value was received for an information item concerning the operation of the motor vehicle, which item was to be monitored, then inquiry 60 is followed by inquiry 62 as to whether the information item concerning the operation of the motor vehicle, which item is to be monitored, was last transmitted within a time lapse from the functional control 21 to the output control 22, whereby the time lapse is equal to or longer than the repeat time. The time lapse, for instance, can amount to double or triple the repeat time.

If the information concerning the operation of the motor vehicle, which information item is to be monitored, was last transmitted from the functional control 21 to the output control 22 within the time lapse, then inquiry 62 is followed by inquiry 60. On the other hand, if the information concerning the operation of the motor vehicle, which item is to be monitored, was last transmitted no (longer) within the time lapse from the functional control 21 to the output control 22, then inquiry 62 is followed by step 63 in which a memory error variable is set at a value ERROR. Step 63 is followed by step 64 in which the output control 22 transmits a request for the transmission of the information concerning the operation of the motor vehicle—which information is to be monitored—to the functional control 21. Step 64 is followed by inquiry 60.

If inquiry 60 shows that a new value was received for a motor vehicle operation value that is to be monitored, then inquiry 60 is followed by step 61 in which the memory error variable is set at a value NOERROR.

Figure 4:
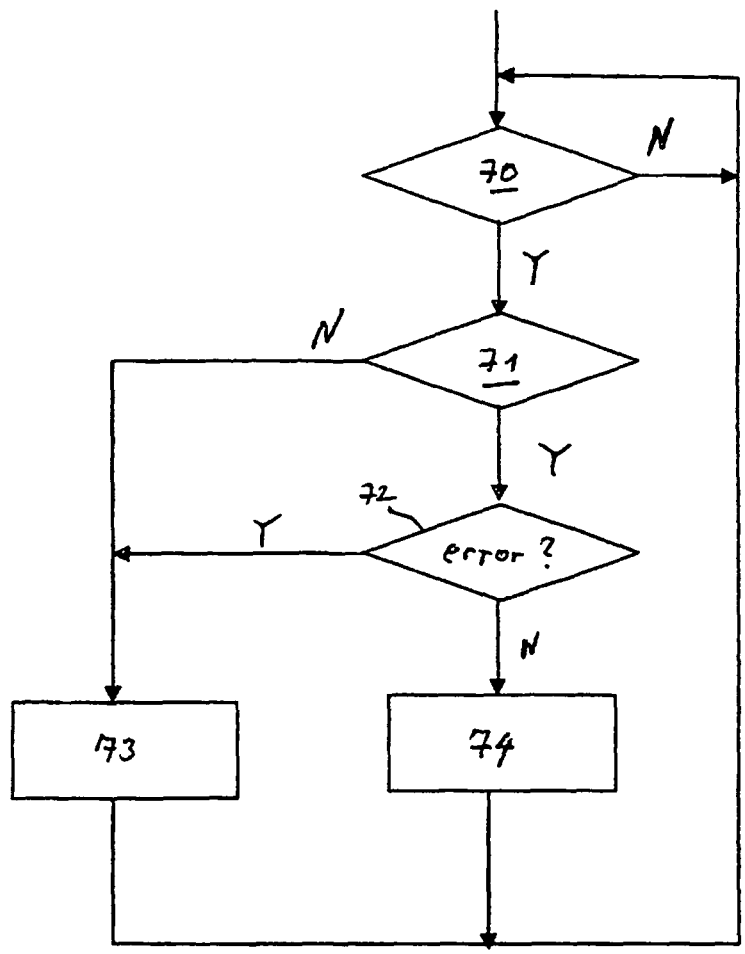
FIG. 4 shows an exemplary embodiment of a process implemented in an interface module.

If by means of input device 26 according to FIG. 2 a requirement is sent out for the optical illustration of an information item concerning the operation of the motor vehicle, then the output control part 40 by means of a request 55 in a format that can be generated by the output control part 40 requests the interface module 25 to supply this information concerning the operation of the motor vehicle. A process, explained below with reference to FIG. 4, is implemented in the interface module 25. Said process starts with a (cyclical) inquiry 70 as to whether an information item 55, transmitted from the output control part 40, was received. If that is so, then inquiry 70 is followed by inquiry 71; otherwise, inquiry 70 takes place again.

By means of inquiry 71, one interrogates whether the requested motor vehicle operation information is an information time stored in the information memory 45. If the required motor vehicle operation information is not an information item stored in the information memory 45, then inquiry 71 is followed by a step 73 in which the requested motor vehicle operation information is interrogated from the functional control 21. Subsequently, step 73 is followed by inquiry 70. The moment the required motor vehicle operation information has been transmitted from the functional control 21 and has been received by interface module 25, that information is supplied to the output control part 40.

If the requested motor vehicle operation information is an information item that is stored in information memory 45, then inquiry 71 is followed by inquiry 72 as to whether the memory error variable has been set at value ERROR. If the memory error variable has been set at value ERROR, then inquiry 72 is followed by step 73. If the memory error variable, on the other hand, is not set at value ERROR, then inquiry 72 is followed by step 74 in which the requested motor vehicle operating information is read out of the information memory 45 and is supplied from the output control part 40. Step 74 is followed by inquiry 70.

Figure 5:
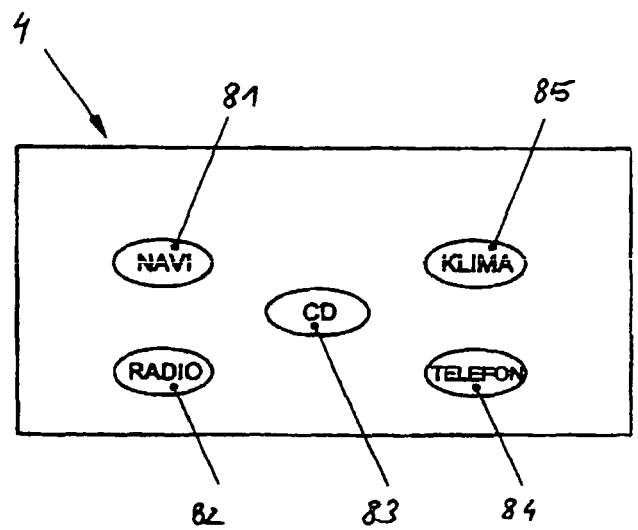
FIG. 5 shows an exemplary embodiment of a base mask, illustrated by means of an input device.
Figure 6:
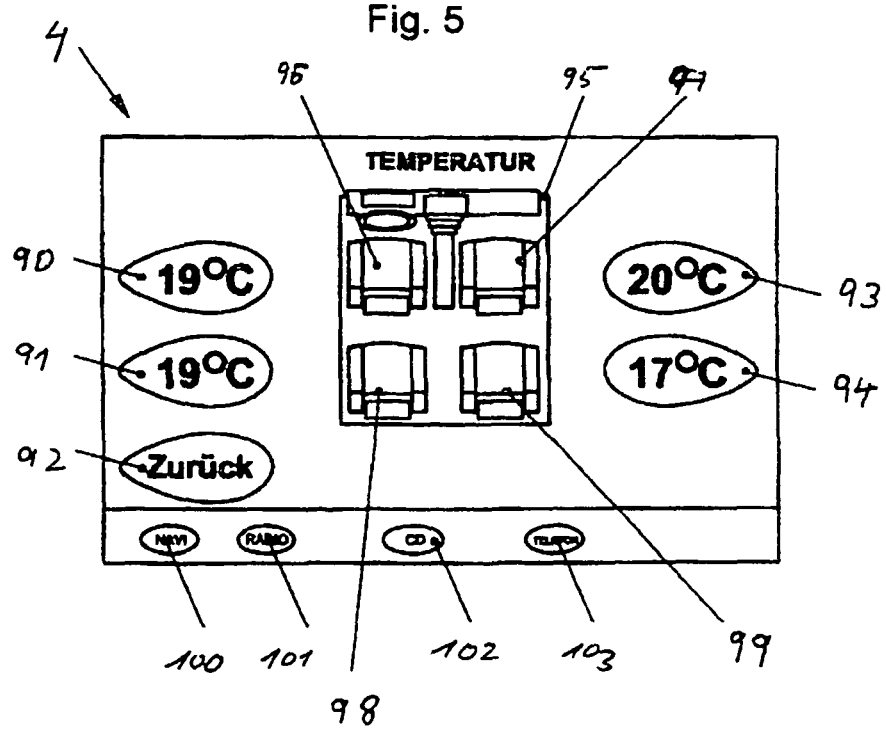
FIG. 6 shows an exemplary embodiment for a mask to operate a climate-controlled unit.

FIG. 5 and FIG. 6 illustrate this process using the example of cooperation between the climate-controlled system 6 and the multifunctional display device 4, which in the exemplary embodiment constituting the basis of FIG. 5 and FIG. 6 comprises a touch screen arranged on a display. In FIG. 5, the multifunctional display device 4 is illustrated in a state indicating a base mask. Here, the multifunctional display device 4 shows five operating elements 81, 82, 83, 84 and 85 that are executed in the form of ellipses. By touching or pressing the operating element 81 in FIG. 5, one can call up a mask for the operation of the navigation system; by touching or pressing operating element 82 in FIG. 5, one calls up a mask for the operation of a radio (as part of music module 8); by touching or pressing operating element 83 in FIG. 5, one calls up a mask for the operation of a CD player (as part of the music module 8) and by touching or pressing operating element 84 in FIG. 5, one calls up a mask for the operation of the phone module 9.

By touching or pressing operating element 85 in FIG. 5, one calls up a mask, illustrated in FIG. 6, for the operation of climate-controlled system 6. In the mask illustrated in FIG. 6, we find illustrated the temperature data of the individual locations in the interior of the vehicle together with the operating elements 90, 91, 92, 93, and 94, whereby the temperature data relate to currently set temperatures that can be changed via operating elements 90, 91, 93 and 94.

The illustration according to FIG. 6 with the heading "TEMPERATURE" and the indication of the interior 95 of motor vehicle 1 clearly shows that the temperature can be adjusted in the interior of the vehicle in an individual manner and with relation to specific seats. Operating element 90 indicates for the front driver's seat 96 that a required temperature of 19° C. has been set. For the front passenger seat 97, operating element 93 indicates that a required temperature of 20° C. has been set. For the rear seats 98 and 99, a required temperature of 19° C. has been set on the left and a required temperature of 17° C. has been set on the right. Operating element 92 has an assignment, that is to say, a function assignment that is illustrated with "back" (to the next higher menu illustration, in other words, in the case at hand, to the mask according to FIG. 5).

Prior to the transition from the base mask illustrated in FIG. 5 to the illustration according to FIG. 6, one must know the required temperatures that are used for regulation in climate-controlled system 6 and that are to be displayed in the operating elements 90, 91, 92 and 94. These temperatures are stored in the information memory 45 in case of faultless operation and are read out of the information memory 45 for display on the multifunctional display device 4.

In the illustration according to FIG. 6, the multifunctional display device 4 indicates operating elements 81, 82, 83 and 84 that correspond to operating elements 100, 101, 102 and 103.

The elements and appliances are not necessarily drawn to scale, and so for the sake of simplicity and clarity. For example, the orders of magnitude of some elements or appliances are illustrated in an exaggerated fashion when compared to other elements or appliances in order to improve the understanding of the exemplary embodiments of the invention at hand.

LIST OF REFERENCES

1 Motor vehicle
2 Engine control
3 Combination display
5 Multifunctional display device
6 Acoustic output device
7 Climate-controlled system
8 Navigation system
9 Music module
10, 24 Telephone module
24 Bus system
14 Sensor
15 Actuator
20 Control system
21 Functional control
22 Output control
23, 25 Interface module
26 Input device
27 Display
30 Functional control part
40 Output control part
45 Information memory
46 Monitoring module
50 Information in a format that can be generated by a functional control part
51, 52, 56, 57 Information in transmission format of bus system
53 Information in a format that can be read in by a functional control part
54 Requirement signal
55 Information in a format that can be generated by an output control part
58 Information in a format that can be read in by an output control part 59 Display control signal
60, 62, 70, 71, 72 Inquiry
61, 63, 64, 73, 74 Step
81, 82, 83, 84,
85, 90, 91, 92,
93, 94, 100, 101,
102, 103 Operating element
95 Display of an interior of a motor vehicle
96 Driver's seat
97 Front passenger seat
98, 99 Rear seat
M Measurement signal
S Control signal

The invention claimed is:

1. Control system for a motor vehicle with an output control for putting out an information item concerning the operation of the motor vehicle and with a functional control, separated in terms of space from the output control for the generation or supply of information concerning the operation of the motor vehicle, wherein the output control comprises an information memory for the storage of information concerning the operation of the motor vehicle, whereby the information concerning the operation of the motor vehicle is accessible from the information memory of the output control, wherein
the control system further comprises a communication link for transmitting the information concerning the operation of the motor vehicle from a functional control to the output control independent of a request to put out information concerning the operation of the motor vehicle, and
the information concerning the operation of the motor vehicle is transmitted from the functional control to the output control responsive to a change concerning the operation of the motor vehicle by the functional control.

2. Control system according to claim 1, wherein the information concerning the operation of the motor vehicle is accessible from the information memory of the output control upon inquiry to put out the information concerning the operation of the motor vehicle.

3. Control system according to claim 1 wherein the information concerning the operation of the motor vehicle is transmitted from the functional control to the output control after expiration of a selected time.

4. Control system according to claim 3, wherein by means of output control, one can monitor whether, within the selected time, the information concerning the operation of the motor vehicle was transmitted from the functional control to output control.

5. Control system according to claim 3, wherein the information concerning the operation of the motor vehicle out of the information memory cannot be put out by output control when the information concerning the operation of motor vehicle was not transmitted within one of the selected time and a time lapse from the functional control to output control, whereby the time lapse is longer than the selected time.

6. Control system according to claim 1 wherein the output control includes a display for the optical illustration of the information concerning the operation of the motor vehicle.

7. Control system according to claim 1, wherein the output control comprises an input device for the purpose of putting in a request for putting out and/or for optical illustration of the information concerning the operation of the motor vehicle.

8. Motor vehicle, including a control system according to claim 1.

9. Process for the control of a motor vehicle with an output control operable for putting out information concerning the operation of the motor vehicle and provided with a functional control separated in terms of space from the output control for the supply of the information concerning the operation of the motor vehicle, wherein the output control includes an information memory for storage of information concerning the operation of the motor vehicle, the process including means for reading out of the information memory the information concerning operation of the motor vehicle, wherein
the information concerning the operation of the motor vehicle is transmitted by means of a communication link independently of a request for putting out the information concerning the operation of the motor vehicle from the functional control to output control into the information memory, and
the information concerning the operation of the motor vehicle is transmitted from the functional control to the output control in the event of a change of the information concerning the operation of the motor vehicle to the functional control.

10. Process according to claim 9, wherein the information concerning the operation of the motor vehicle is transmitted by means of a communication link from the functional control to the output control, into the information memory.

11. Process according to claim 9, wherein the information concerning the operation of the motor vehicle is transmitted from the functional control to the output control after expiration of a selected time.

12. Process according to claim 11, including monitoring within the selected time, whether the information concerning the operation of the motor vehicle, was transmitted from the functional control to the output control.

* * * * *

UNITED STATES PATENT AND TRADEMARK OFFICE
CERTIFICATE OF CORRECTION

PATENT NO. : 8,515,617 B2  
APPLICATION NO. : 10/593453  
DATED : August 20, 2013  
INVENTOR(S) : Frank-Martin Wille et al.

Page 1 of 1

It is certified that error appears in the above-identified patent and that said Letters Patent is hereby corrected as shown below:

Title Page Col. 1 (7th Inventor), Line 7, Delete "Yvonne Grob," and insert -- Yvonne Gross, --, therefor.

Title Page Col. 1 (Residence of 12th Inventor), line 12, Delete "Zellendorf" and insert -- Zehlendorf --, therefor.

Signed and Sealed this  
Twelfth Day of November, 2013

Teresa Stanek Rea  
*Deputy Director of the United States Patent and Trademark Office*